United States Patent
Goodrich et al.

[11] Patent Number: 6,158,173
[45] Date of Patent: Dec. 12, 2000

[54] METHOD FOR MOUNTING AND DISMOUNTING A SLIDING VAN DOOR IN A SLOTTED DOOR TRACK

[75] Inventors: Ronald W. Goodrich, Logansport; Paul D. Crawford, Winamac, both of Ind.

[73] Assignee: The Braun Corporation, Winamac, Ind.

[21] Appl. No.: 09/473,507

[22] Filed: Dec. 28, 1999

Related U.S. Application Data

[62] Division of application No. 09/429,241, Oct. 28, 1999, which is a continuation of application No. 08/914,587, Aug. 18, 1997, abandoned.

[51] Int. Cl.⁷ .............................. E06B 3/00; E05D 15/10; E05F 11/54
[52] U.S. Cl. ................. 49/506; 49/213; 49/360; 49/425; 49/453
[58] Field of Search .............................. 49/213, 127, 128, 49/360, 425, 453, 375, 409, 506; 16/95 R

[56] References Cited

U.S. PATENT DOCUMENTS

| | | |
|---|---|---|
| 2,082,541 | 6/1937 | Haberstump . |
| 4,981,321 | 1/1991 | Wantanabe et al. . |
| 4,991,905 | 2/1991 | Wantanabe et al. . |
| 5,271,181 | 12/1993 | Pietro . |
| 5,398,988 | 3/1995 | DeRees et al. . |
| 5,618,080 | 4/1997 | Sullivan et al. . |
| 5,749,172 | 5/1998 | Isopahkala . |
| 5,893,242 | 4/1999 | Perron . |

FOREIGN PATENT DOCUMENTS

| | | |
|---|---|---|
| 675924 | 5/1939 | Germany . |
| 2358867 | 10/1975 | Germany . |
| 3545856 | 1/1987 | Germany . |
| 1456283 | 11/1976 | United Kingdom . |

*Primary Examiner*—Daniel P. Stodola
*Assistant Examiner*—Gregory J. Strimbu
*Attorney, Agent, or Firm*—Woodard, Emhardt, Naughton, Moriarty & McNett

[57] ABSTRACT

A method of mounting and dismounting a sliding door to and from a door track structure having a slot and mounted adjacent a vehicle roof. The door having an arm member having a roller assembly mounted adjacent an end of the arm member. The roller assembly having an upper and a lower disc portion and an intermediate necked portion. The track structure having an insert and release hole intersecting the slot at a cord of the hole and the slot having a width smaller than the diameter of the hole. The method of mounting the door to the track structure comprising the steps of inserting the roller assembly into the insert and release hole in the track structure and pressing the intermediate necked portion of the roller assembly through the intersection to cause the roller assembly to move from the hole into the slot to engage the slot. The method of dismounting the door from the track structure comprising the steps of pressing the intermediate necked portion of the roller assembly through the intersection to cause the roller assembly to move from the slot into the hole and removing the roller assembly from the hole.

2 Claims, 3 Drawing Sheets

METHOD FOR MOUNTING AND DISMOUNTING A SLIDING VAN DOOR IN A SLOTTED DOOR TRACK

RELATED APPLICATIONS

This application is a Divisional of application Ser. No. 09/429,241 filed Oct. 28, 1999 by the same inventors, titled "Method And Apparatus For Mounting And Dismounting A Sliding Van Door In A Slot-Type Door Track"; which is in turn a Continuation of application Ser. No. 08/914,587 filed Aug. 18, 1997 by the same inventors, titled "Van Door Header And Sill Assemblies Having A Floating Roller Arm", now abandoned. The priority of each of these applications is hereby claimed under 35 USC §120.

TECHNICAL FIELD

The invention relates to sliding side doors for passenger vehicles, principally vans and buses, and more particularly to improved narrow vertical profile header and sill assemblies, each having a floating roller arm for guided travel of the door from its open to closed position and back. The improvement in the header and sill assemblies permits increasing the vertical entry clearance between the floor and transom of the van which is particularly useful to permit entry and exit of handicapped persons there through, particularly wheelchair users.

BACKGROUND

Vans and minivans have become extremely popular in the past 10–15 years. These vehicles are characterized by having at least one sliding side door which moves on a midpoint track at its rear marginal edge, and two forward tracks, one each at the upper header and the lower sill. In current commercially available vans, the header is on the order of two to three inches in vertical height while the sill is on the order of two to four inches in vertical height. Typically the sill track mechanism is located below the floor level.

Vans have also become the vehicle of choice for disabled persons who require wheelchairs or scooters for mobility. A variety of approaches for effecting the entry of disabled persons into and from these vehicles are available. Primary among them are wheelchair lifts and ramps. In addition, there are vehicle "kneeling" assemblies, which in their most common form, compress the springs of the vehicle on one side or in the front only, so that the vehicle tilts downward towards the passenger entry door to permit easier entrance.

A somewhat different approach is provided by customizing vans in which the floors are lowered on the order of six to eight inches. When combined with either the kneeling feature or motorized bifold ramps, lowered floors provide simple access for wheelchair and scooter users. Alternately, roofs can be raised, but this requires more complex customizing of the door and does not reduce the vertical distance from ground to vehicle floor that the wheelchair must ascend.

One of the serious disadvantages in customizing vans by lowering the floor or raising the top is that the vertical height of the header and the vertical level of the sill are limitations to maximizing the vertical opening height. These add from four to seven inches to accommodate the front arms of the sliding door hardware. Accordingly, by reducing the profile (vertical height) of these elements, one can increase the available total entry height by some four to five inches, which is very significant.

In addition, mounting, adjusting and dismounting conventional sliding or rolling slide doors is difficult because of complicated header and sill roller or slide mechanisms. They are not only difficult to mount and dismount, but also to adjust inwardly and outwardly with respect to the center line of the vehicle to assure proper latching and a tight seal against wind and weather.

Accordingly, there is an unfilled need in the art to have an improved header and/or sill assembly for rolling or sliding type side doors for vans which are lower in profile and permits ease of mounting, dismounting and adjustment.

BRIEF SUMMARY OF THE INVENTION

It is among the objects and advantages of the invention to provide an improved header mechanism for van doors which employs a floating roller arm which is easy to mount, dismount and adjust for proper fit and weather-tight seal. It is another object and advantage of the invention to provide a retrofit assembly for customizing vans comprising an improved header of extremely low profile which employs a floating arm, the outer end of which is securable to the inside face of the forward edge of a van door, and the inner end thereof floats upwardly and downwardly and is adjustable inwardly or outwardly with respect to the center line of the vehicle to permit precise adjustment for fit and seal. Another object and advantage of this invention is to provide an improved sill assembly of very low vertical profile which employs an improved roller arm which is suitable for retrofit van conversion, and which is easily attachable to the interior lower forward corner of a van door and provides excellent fit, positive tracking and seal of the door in its closed condition. Still other objects and advantages of the invention will be evident from the accompanying drawings and description.

The header aspect of the invention comprises a generally rectangular plate having a front and a rear end, with its longitudinal axis generally parallel to the longitudinal axis of the vehicle in which the slidable side door is mounted. The plate is oriented horizontally and has a roller-receiving slot therein which has an arcuate forward portion and generally straight mid and rear portions. Merging with the slot is a roller insert/release hole or aperture, through which the dumbbell roller of the door roller arm can be inserted into the slot or removed therefrom. This roller insert/release hole, in the preferred embodiment, is located forward of the rear-most end of the roller slot, on the inside of the slot. But it may be located at any convenient position along the track, either on the inside edge or the outside edge. However, it is most preferably located as above-described so that the door may be fully opened without the roller engaging the hole. Thus, it is preferable that this hole not be located at the very end travel point of the track because the door is fully closed or opened and latched at those positions. Since the hole is not located at either extreme rest point of the door, there will be substantially no chance for the door to become accidently removed from its track during normal operations. Since the weight on the door is generally outward, when it is unlatched in order for it to roll, placing the hole on the inside of the slot means that the door roller will not accidently roll into that hole.

In the preferred embodiment shown here, the rollers insert/release hole is generally round, and intersects the slot at a chord of the circle rather than at a diameter. The chord length is slightly shorter than the diameter of the center spindle portion of the roller bearing so that the door must be forced inwardly to snap into place into the roller insert/release hole.

The roller bearing is preferably a dumbbell type of double roller having an upper disk and a lower disk, spaced apart by the central spindle section which is slightly longer than the thickness of the planar plate in which the slot is formed. The dumbbell may be multi-part or unitary. The insert/release hole is slightly larger in diameter than the diameter of the roller disc. The dumbbell type roller is journaled on a pin (shaft) that can adjustably fastened in a slot adjacent to the inboard end of the door arm. The outboard end of the arm is adapted to be pivotally received between a pair of right angle brackets which fasten to the inner face of the door at its upper forward margin.

The plate preferably includes one or more upstanding mounting flanges along the interior and/or exterior margins of the plate to keep the plate generally horizontally aligned with the roof members and to shield access to the space formed between the top face of the plate and the underside of the roof members. In addition, the forward and rear ends of the plate may have suitable upstanding or depending mounting plates joined thereto or formed integrally therein for mounting to, or adjacent to, the forward B pillar and the rear framing member of the door opening of the van.

The sill embodiment of the invention comprises a similar plate and slot with insert/release hole, with a rigid arm having the "dumbbell" type roller mounted on the inboard end thereof. The brackets are mounted to the forward lower end of the door. The upper and lower plates are mounted generally co-planar and co-axially so that the door closes properly.

It should be noted that the dumbbell roller is adjustably mounted in a slot adjacent to the inboard end of the door roller arm. This permits the top and bottom of the door to be adjusted precisely for full closure and a seal. Thus, the vertical center line of the door can be tilted inwardly or outwardly (Camber) with respect to true vertical in order to ensure a good seal. For example, where the vehicle side walls are tilted slightly inwardly, the door center line can be precisely angularly aligned by the lateral adjustment of the roller in the slot on the inboard end of the upper door mounting arm with respect to the lower arm.

The door mounting assembly comprises a U-shaped bracket or a pair of spaced, L-shaped brackets mountable to the inner face of the door. The arm on which the dumbbell roller is mounted pivots up and down on a horizontal pin journaled in the bracket(s). The arm floats. That is, due to the pivot mounting of the outboard end of the arm, the inboard end can float upwardly and downwardly. The upper roller arm floats, whereas the bottom roller arm is either rigidly mounted or floats only downwardly in order to carry the weight of the door. That is, the bottom arm in a first embodiment is not pivoted at the outboard end, but is rigidly secured to the brackets mountable to the inner face of the door at its lower forward corner. This is so that the weight of the forward end of the door is carried and fully supported by the lower arm. In a second embodiment, the arm is pivoted at the outboard end but that end is L-shaped, with the short arm up, to carry the weight. Since the end is L-shaped, the lower roller arm can pivot down out of the release hole. The upper arm is pivoted at its outer end so that the roller bearing can be pushed laterally into the release hole (aperture) and then dropped down out of the hole to completely disengage the top forward corner of the door so that the door can be easily mounted or dismounted. As in the header roller, the position of the sill roller In the mounting slot in the lower support arm can be adjustably secured inwardly or outwardly with respect to the vehicle center line to insure proper fit and seal.

BRIEF DESCRIPTION OF DRAWINGS

The invention is illustrated by reference to the drawings in which:

FIG. 7 is a plan view of a portion of the header plate designated by arrows 7—7 in FIG. 1, as seen from above the plate showing the rear portion of the slide track slot and roller insertion/removal hole, the outboard margin of the header plate being at the top to the figure; and FIG. 8 is a cross-sectional view of the dumbbell roller assembly and roller mounting bolt shown mounted in the adjustment slot of the floating roller arm.

DETAILED DESCRIPTION OF BEST MODE FOR CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what is presently believed to be the best mode of carrying out the invention.

Figure 1:
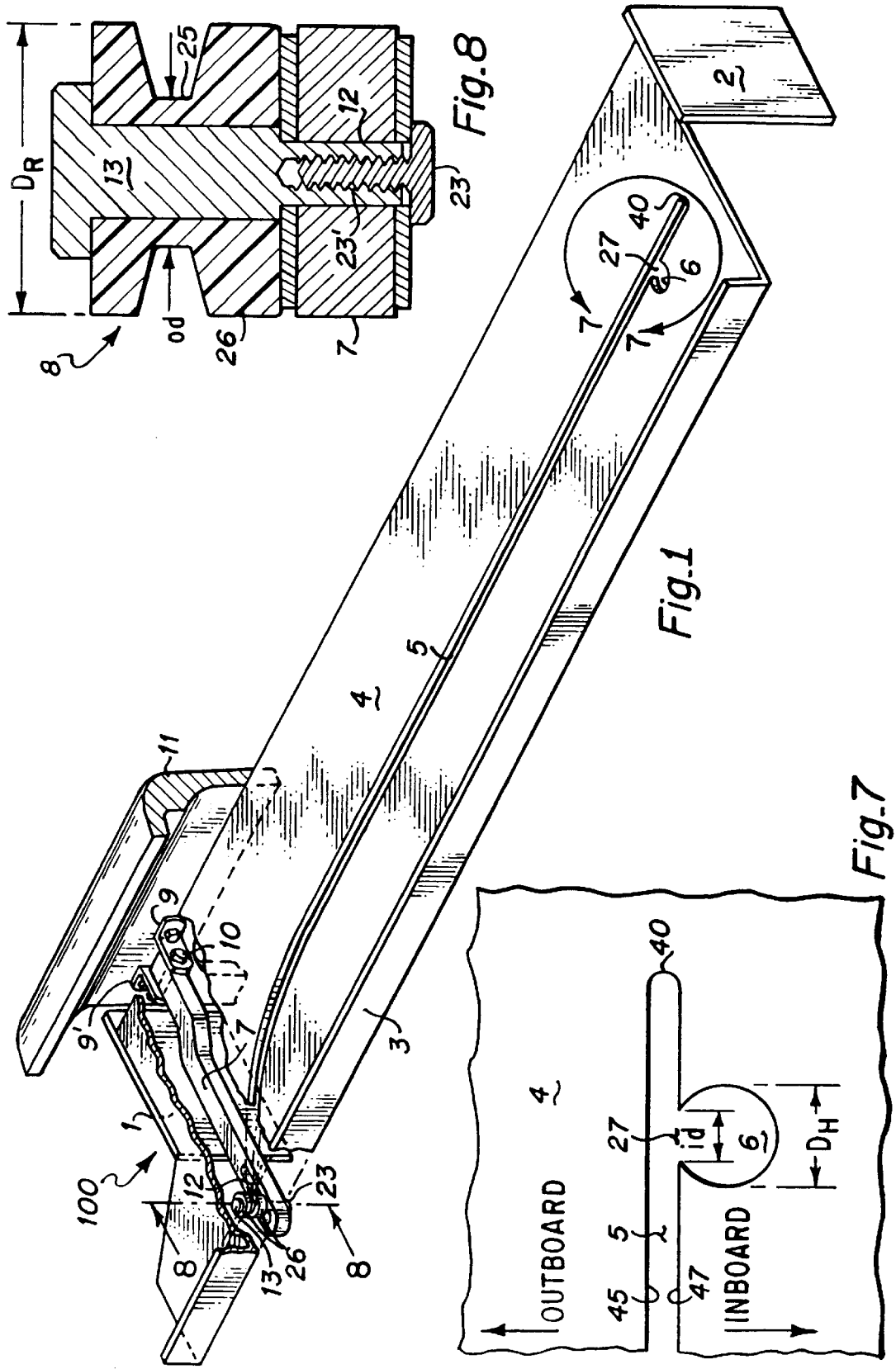
FIG. 1 is a ¾ elevated isometric view of a sliding door header assembly for installation in a van or similar vehicle, with a floating roller arm pivotally connected adjacent its outboard end to the upper forward end of a van door (portion of door shown) as seen from inside the vehicle from above the header plate, the left-hand edge of the drawing facing the forward end of the vehicle.

FIG. 1 shows a vehicle sliding door header assembly with a floating roller arm, shown in the door-closed position as seen from inside the vehicle, the left-hand edge of the drawing facing the forward end of the vehicle. The door header assembly 100 comprises generally rectangular header track plate 4 having a forward mounting plate 1 and a rear mounting plate 2 for mounting the header assembly to one or more of the vehicle B pillar 30 and the rear doorway frame members 35 respectively, (see FIG. 2), and to the roof trusses 14 (see FIGS. 2–3). An interior flange 3 is attached to one or more of the roof framing members 14 of the vehicle (see FIG. 2). The header plate 4 includes a slide track slot 5, and a roller insertion/release hole 6 communicating with the slide track slot 5 by intersection of the hole 6 with slot 5 at chord 27. A floating roller arm 7 is slidably engaged in the slide track slot by means of a dumbbell roller assembly 8 mounted on the interior (inboard) end of the roller arm. The roller arm is pivotally connected at its outboard end to a pair of door mounting brackets 9 and 9' by means of a pivot pin 10. The door mounting brackets are mounted on the inner upper forward corner of a vehicle door 11, a portion of which is shown in FIGS. 1, and 4. The inboard end of the roller arm is provided with an adjustment slot 12 which engages a roller mounting pin 13 on which the roller assembly 8 is mounted. The roller mounting pin 13 is tightened by bolt 23 (FIG. 8) to adjustably secure the roller assembly in the slot for accurate positioning of the vehicle door for closure and weather sealing.

Figure 2:
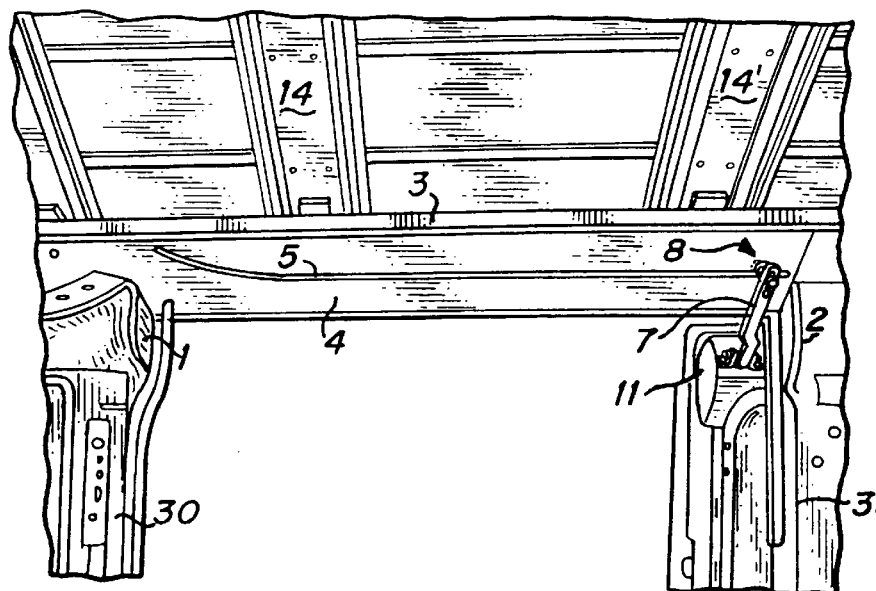
FIG. 2 is a photograph from the interior of a modified van depicting a reduced profile sliding door header slide track, in the door-open position as mounted between the B pillar on the left and the rear of the door frame on the right; aft end of the sliding door header with floating roller arm journalled in the slot and showing the insertion/release hole.

FIG. 2 is a photograph of an overall interior view of a van depicting a reduced profile sliding door header assembly, in the door-open position as installed in the vehicle. Mounting plates 1 and 2 are adapted for mounting on the fore and aft vertical doorway frames of the vehicle 30 and 35 respectively. Interior flange 3 is mounted to the vehicle roof frames 14 and 14'.

Figure 3:
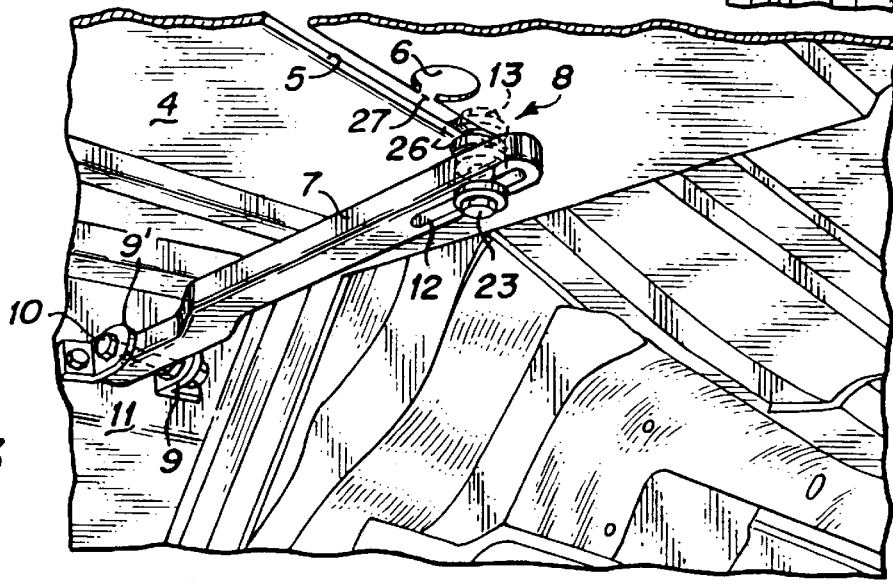
FIG. 3 is a close-up photograph depicting the aft end of the sliding door header with floating roller arm journalled in the slot and showing the adjustable mounting of the pin carrying the roller assembly in the arm and the insertion/release hole.
Figure 4:
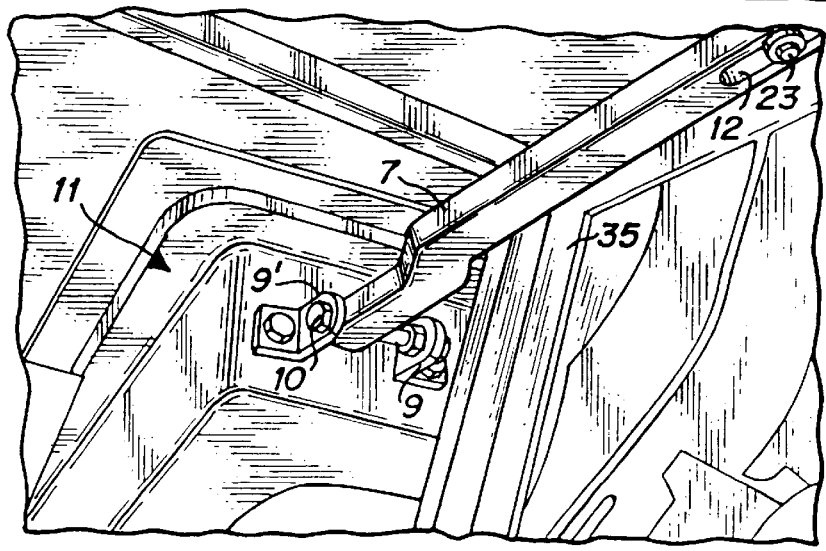
FIG. 4 is a close-up photograph depicting the floating pivot connection of the roller arm to mounting brackets on the forward portion of van door.

FIG. 3 is a photograph of the same vehicle configuration as FIG. 2, depicting in close-up the relationship between the vehicle sliding door 11, the floating roller arm 7, and the header plate 4, with the door in the fully open position. Note that hole 6 is forward of the rear end 40 of slot 5 (best seen in FIG. 1). It also shows the attachment of the floating roller arm to roller assembly 8 by means of roller mounting pin/bolt assembly 13/23 secured in adjustment slot 12. The relationship between roller insertion/release hole 6 and slide track slot 5 is also shown.

FIG. 4 is a photograph of the same vehicle configuration as FIG. 3, depicting in close-up the mounting of door mounting brackets 9 and 9' to the vehicle sliding door 11, and the pivotal mounting of floating roller arm 7 to these brackets by means of pivot pin 10.

Referring to FIGS. 3, 4, 7 and 8, the pivotal mounting of the roller arm to the door by means of pin 10 in brackets 9 and 9' permits the roller arm 7 to be rotated upwardly or downwardly to allow convenient installation or removal of the door from the slide track slot 5 by passing the roller assembly through the roller insertion/release hole 6. The roller insertion/release hole can be seen to be accessible only with the door in a predetermined intermediate position forward of the aft interlocked position, the roller arm being fully restrained in inboard/outboard motion by the slide track slot with the door in either fully closed or fully open positions, and during travel back and forth there between. The vehicle door 11 is mounted to the header plate 4 by inserting the roller assembly 8 into the hole 6 and pressing the neck 25 through the intersection cord 27 to cause the roller assembly 8 to move from the hole 6 into the slot 5. The vehicle door 11 is dismounted from the header plate 4 by pressing the neck 25 through the intersection cord 27 to cause the roller assembly 8 to move from the slot 5 into the hole 6 and removing the roller assembly 8 from the hole 6.

Figure 5B:
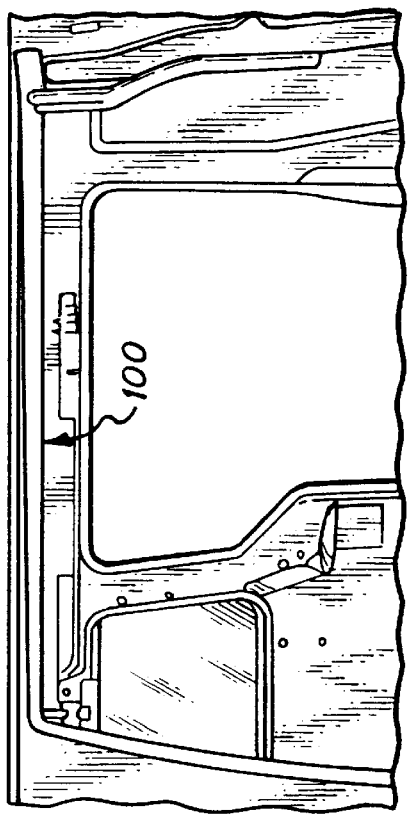
FIGS. 5a and 5b are a pair of close-up comparative photographs, of an exterior view of a van sliding door in the open position, with FIG. 5a being the "before" photograph of an OEM header and FIG. 5b being the "after" photograph of the thin profile header assembly of this invention.
Figure 5A:
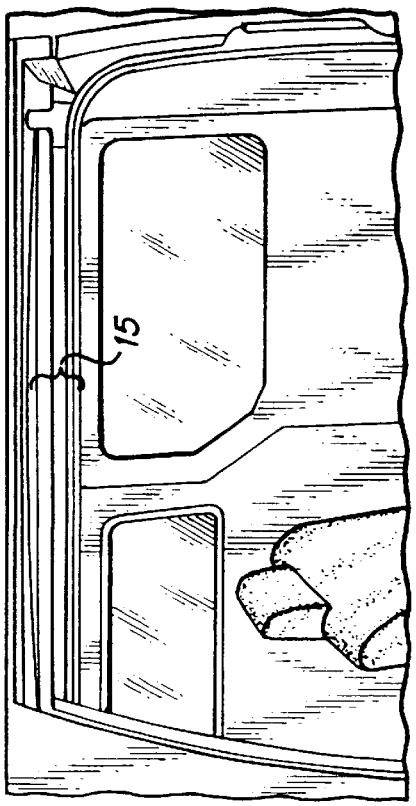

FIG. 5a is a photographic close-up showing particularly the upper portion of the sliding door opening of a van in its originally manufactured configuration with the OEM header 15. FIG. 5b is a photographic close-up showing a the same van with reduced profile sliding door header 100 of this invention. This shows the increase in vertical height of the doorway made possible by the invention.

Figure 6B:
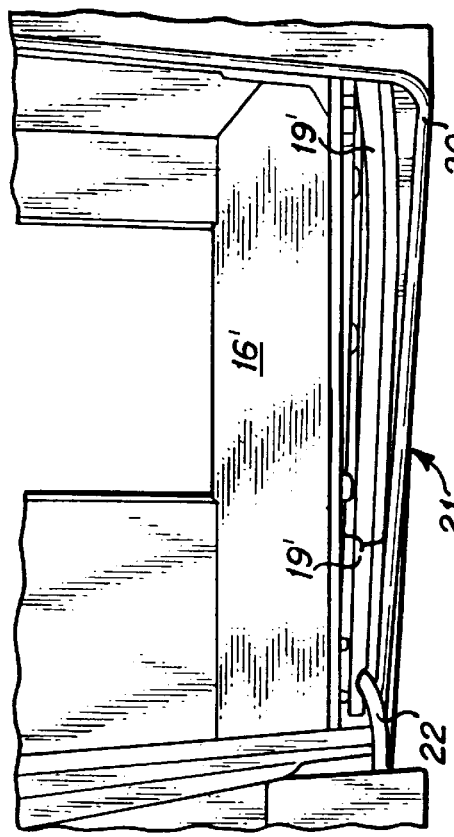
FIGS. 6a and 6b are a pair of "before and after" photographs of the sill assembly, with FIG. 6a being the "before" photograph of an OEM sill and FIG. 6b being the "after" photograph of the thin profile lowered floor, door sill and slide track of this invention.
Figure 6A:
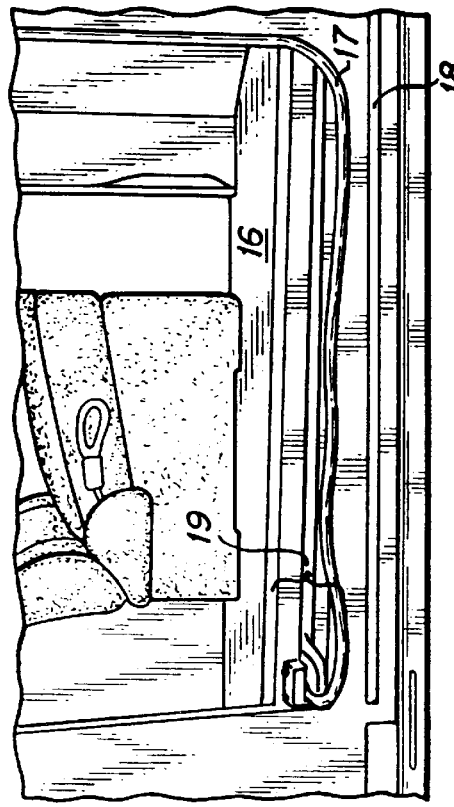

FIG. 6a is a photograph showing the lower portion of a sliding door opening of a van in its originally manufactured configuration with the sill track assembly 19 below the floor 16 and above inner seal 17 and lower seal 18. FIG. 6b is a photograph showing a the same van with the newly configured doorway of the invention. This shows the lowered floor 16', sill track 19' installed in a lower position, and a single lower seal 20. Note that the vertical profile from floor to bottom of door opening 21 is greatly reduced. Either the original (OEM) sill track 19' may be used with the single lower seal 20, or a reduced profile sill (as in FIG. 1 but with curved arm 22 being above the plate 4) may be used.

FIG. 7 is a plan view of a portion of the header plate designated by arrows 7—7 FIG. 1, showing the rear portion of the slide track slot and roller insertion/release hole 6, the outboard margin of the header plate being at the top of the figure. since the center of mass of the door is generally outboard of the slide track slot 5, the bearing force of the roller assembly 8 is caused to be applied to the outboard face 45 of the slide track slot, preventing the roller from contacting the intersection 27 of the slide track slot 5 and roller insertion/release hole 6 on the inboard edge of the slot 47 during door opening and closing. The minimum dimension of this intersection chord 27 of hole 6 with the inside edge of slot 47 is indicated as "id".

FIG. 8 is an elevation view in cross-section of the dumbbell roller assembly 8 and roller mounting pin 13 shown mounted, via bolt 23 in the adjustment slot 12 of the floating roller arm 7, pin 13 being internally threaded to receive the threaded portion 23' of bolt 23. The outside diameter of the neck or spindle 25 of roller is indicated as "od" and is bounded by upper and lower disc portions 26. The dumbbell roller assembly 8 is of conventional design known in the art. However, with reference to FIG. 7, the dimension id of the intersection chord 27 on the inside edge 47 of the slide track slot 5 and the roller insertion/release hole 6 is selected to be just slightly less than the outside diameter od 25 of the roller 8, to require a push or snap-in to hole 6, in order to transfer the roller between the roller insertion/release hole 6 and slot 5. The diameter $D_H$ of the hole 6 is slightly larger than the outer diameter $D_R$ of the roller 25 and the slot 5 has a width smaller than the diameter of the hole 6.

It is clear that the reduced profile header and the reduced profile sill assemblies of this invention have wide applicability in the van conversion field, particularly as they alone or together provide improved vertical door clearance, especially useful for wheelchair users.

It should be understood that various modifications within the scope of this invention can be made by one of ordinary skill in the art without departing from the spirit thereof.

What is claimed is:

1. A method of mounting a sliding door to a door track structure having a slot and mounted adjacent a vehicle roof, said door having an arm member having a roller assembly mounted adjacent an end of said arm member; said method comprising the steps of:

a) inserting said roller assembly into an insert and release hole in said slide track structure, said roller assembly having an upper and a lower disc portion and an intermediate necked portion; and said insert and release hole intersecting said slot at a cord of said hole, and said slot having a width smaller than the diameter of said hole;

b) pressing said intermediate necked portion of said roller assembly through said intersection to cause said roller assembly to move from said hole into said slot to engage said slot, so as to slidably mount said door to said track structure.

2. A method of dismounting a sliding door from a door track structure having a slot and mounted adjacent a vehicle roof, said door having an arm member having a roller assembly mounted adjacent an end of said arm member, said roller assembly having an upper and a lower disc portion and an intermediate necked portion, said track structure having an insert and release hole intersecting said slot at a cord of said hole and said slot having a width smaller than the diameter of said hole; said method comprising the steps of:

a) pressing said intermediate necked portion of said roller assembly through said intersection to cause said roller assembly to move from said slot into said hole;

b) removing said roller assembly from said hole so as to dismount said door from said track structure.

* * * * *